(12) United States Patent
Sugihara et al.

(10) Patent No.: US 11,597,189 B2
(45) Date of Patent: Mar. 7, 2023

(54) REFRIGERANT-TRANSPORTING HOSE

(71) Applicant: THE YOKOHAMA RUBBER CO., LTD., Tokyo (JP)

(72) Inventors: Koki Sugihara, Hiratsuka (JP); Ikuma Yusa, Hiratsuka (JP); Daisuke Maeda, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 300 days.

(21) Appl. No.: 17/025,161

(22) Filed: Sep. 18, 2020

(65) Prior Publication Data
US 2021/0162722 A1 Jun. 3, 2021

(30) Foreign Application Priority Data

Nov. 28, 2019 (JP) .............................. JP2019-215264

(51) Int. Cl.
*B32B 25/14* (2006.01)
*B32B 1/08* (2006.01)

(52) U.S. Cl.
CPC ............... *B32B 25/14* (2013.01); *B32B 1/08* (2013.01); *B32B 2319/00* (2013.01); *B32B 2597/00* (2013.01)

(58) Field of Classification Search
CPC ....... B32B 25/14; B32B 1/08; B32B 2319/00; B32B 2597/00
See application file for complete search history.

(56) References Cited

U.S. PATENT DOCUMENTS 5,159,014 A * 10/1992 Tsutsumi ................ C08L 51/06
525/66
5,362,530 A * 11/1994 Kitami .................... F16L 11/12
428/458
5,488,974 A * 2/1996 Shiota .................... F16L 11/081
428/36.2

(Continued)

FOREIGN PATENT DOCUMENTS

JP 2000-104866 A 4/2000
JP 2006-307987 A 11/2006

*Primary Examiner* — Craig M Schneider
*Assistant Examiner* — David R Deal
(74) *Attorney, Agent, or Firm* — Carrier Shende & Associates, P.C.; Joseph P. Carrier; Anne G. Sabourin

(57) ABSTRACT

A refrigerant-transporting hose including an inner tube, an outer tube, and a reinforcing layer between the inner tube and the outer tube, the outer tube being formed of an outer tube rubber composition, the outer tube rubber composition containing a brominated copolymer rubber obtained by brominating a copolymer rubber of isomonoolefin and p-alkylstyrene, the content of the repeating units having bromine constituting the brominated copolymer rubber being from 0.8 to 1.5 mol % with respect to the total amount of the repeating units constituting the brominated copolymer rubber, a carbon black A having a dibutyl phthalate absorption amount of 40 cm$^3$/100 g or less, a brominated alkylphenol resin, and zinc oxide, the content of the carbon black A being 35 parts by mass or greater with respect to 100 parts by mass of the brominated copolymer rubber. Such refrigerant-transporting hose achieves both workability and sealing property at an excellent level.

15 Claims, 3 Drawing Sheets

(56) References Cited

U.S. PATENT DOCUMENTS

| | | | |
|---|---|---|---|
| 6,534,578 B1* | 3/2003 | Daikai | B32B 25/04 524/346 |
| 6,548,585 B1* | 4/2003 | Ozawa | C08L 61/06 524/451 |
| 7,067,592 B2* | 6/2006 | Chino | C08F 8/30 524/99 |
| 2009/0038729 A1* | 2/2009 | Soeda | B32B 7/10 428/317.1 |
| 2011/0186170 A1* | 8/2011 | Oishi | F16L 9/14 138/140 |
| 2013/0056106 A1* | 3/2013 | Yamakawa | B32B 27/18 138/137 |
| 2013/0068338 A1* | 3/2013 | Shinoda | B32B 1/08 138/140 |
| 2013/0174933 A1* | 7/2013 | Yamakawa | F16L 11/081 138/137 |
| 2019/0322069 A1* | 10/2019 | Sato | B32B 1/08 |

* cited by examiner

REFRIGERANT-TRANSPORTING HOSE

TECHNICAL FIELD

The present invention relates to a refrigerant-transporting hose.

BACKGROUND ART

In the related art, a refrigerant-transporting hose made of rubber has been used in a car air conditioner system of an automobile. In a configuration in which the hose is connected to a metal pipe in the air conditioner system, the hose can be connected to the pipe by, for example, inserting the end of the pipe into the hose from the end of the hose, and caulking (tightening) the hose from the outside of the hose using a metal fastener.

Then, in a car air-conditioning system of an automobile, a mixture of a refrigerant and refrigerating machine oil usually flows inside the hose or the like.

For example, Patent Document 1 proposes a rubber composition for a hose that can be used as a refrigerant-transporting hose in which a mixture containing a refrigerant or the like is circulated inside.
Patent Document 1 discloses a hose rubber composition containing
- (A) 100 parts by weight of a brominated copolymer rubber of isomonoolefins with 4 to 7 carbon atoms and p-alkylstyrene, the p-alkylstyrene (PMS) content being from 5 to 25 wt. %, the bromine (Br) content being 1.5 wt. % or greater, and the weight ratio of the p-alkylstyrene unit and the bromine unit being 0.15≤Br/PMS≤0.40,
- (B) 0.1 to 10 parts by weight of zinc white, and
- (C) 1 to 15 parts by weight of a brominated alkylphenol resin.

Patent Document 1 describes that the composition may further contain carbon black and the like, and HAF grade carbon black is described as the carbon black.

In addition, for example, Patent Document 2 proposes a hose that can be applied to an air conditioner hose for automobiles.

Patent Document 2 discloses a hose including at least an inner rubber layer, a reinforcing layer having a spiral braided structure of two or more layers, and an outer rubber layer in this order from the inner peripheral side, the ratio of the strength at break at 135° C. ($T_B$) of the rubber material forming the inner rubber layer to the intermediate elongation at 1.2 cN/dtex at 135° C. of the reinforcing yarn forming the reinforcing layer ($T_B$/intermediate elongation) being 1.7 or greater.

In addition, Patent Document 2 describes that the inner tube of the hose is formed of a rubber composition containing brominated isobutylene-co-para-methylstyrene (BIMS), SRF carbon black and the like.

CITATION LIST

Patent Literature

Patent Document 1: JP 2000-104866A
Patent Document 2: JP 2006-307987A

SUMMARY OF INVENTION

Technical Problem

On the other hand, the current automobile use environment covers a wide range from cold regions to tropical regions. In addition, considering that the engine room of automobiles has become extremely hot recently due to the installation of turbo engines, etc., it is required for the refrigerant-transporting hose that the refrigerant and the like do not leak from the joint between the refrigerant-transporting hose and the pipe even in a wide temperature environment such as from −30 to +125° C.

Under these circumstances, the present inventors prepared a rubber composition with reference to Patent Documents 1 and 2 and evaluated a hose using the rubber composition. As a result, they found that, in a configuration in which such a hose is caulked as described above and connected to a pipe, the sealing property (hose sealing performance) in the caulked portion (crimped portion) is weak and stable sealing property cannot be obtained. It is considered that the weak sealing property at the caulked portion causes the refrigerant to leak from the joint between the refrigerant-transporting hose and the pipe.

Further, when the rubber composition is designed so that the modulus of the rubber is simply increased to improve the sealing property of the hose by caulking, it was found that the viscosity of the rubber composition (uncrosslinked state) may increase accompanying the above design. There was a concern that the increase in the viscosity of the rubber composition (uncrosslinked) accompanying the above design will lead to deterioration of workability during hose production such as extrudability.

Therefore, an object of the present invention is to provide a refrigerant-transporting hose which can achieve both excellent workability and sealing property at an excellent level.

Solution to Problem

As a result of diligent research to solve the problems described above, the present inventors found that a desired effect can be achieved by allowing a refrigerant-transporting hose to have an outer tube formed of a specific outer tube rubber composition, and thus completed the present invention.

The present invention is based on the findings described above and, specifically, solves the problem described above by the following features.

[1] A refrigerant-transporting hose including an inner tube, an outer tube, and a reinforcing layer between the inner tube and the outer tube,
the outer tube being formed of an outer tube rubber composition,
the outer tube rubber composition comprising
a brominated copolymer rubber obtained by brominating a copolymer rubber of isomonoolefin and p-alkylstyrene, the content of the repeating units having bromine constituting the brominated copolymer rubber being from 0.8 to 1.5 mol % with respect to the total amount of the repeating units constituting the brominated copolymer rubber,
a carbon black A having a dibutyl phthalate absorption amount of 40 cm$^3$/100 g or less,
a brominated alkylphenol resin, and
zinc oxide,
the content of the carbon black A being 35 parts by mass or greater with respect to 100 parts by mass of the brominated copolymer rubber.

[2] The refrigerant-transporting hose according to [1], in which the iodine adsorption amount of the carbon black A is from 10 to 40 g/kg.

[3] The refrigerant-transporting hose according to [1] or [2], in which the carbon black A is FTF carbon black.

[4] The refrigerant-transporting hose according to any one of [1] to [3], further containing a carbon black B having a dibutyl phthalate absorption amount from 50 to 80 cm$^3$/100 g.

[5] The refrigerant-transporting hose according to [4], in which the iodine adsorption amount of the carbon black B is from 15 to 30 g/kg.

[6] The refrigerant-transporting hose according to [4] or [5], in which the carbon black B is SRF carbon black.

[7] The refrigerant-transporting hose according to any one of [4] to [6], in which the content of the carbon black B is from 20 to 120 parts by mass with respect to 100 parts by mass of the brominated copolymer rubber.

[8] The refrigerant-transporting hose according to any one of [1] to [7], in which the outer tube rubber composition further contains talc, and the content of the talc is from 10 to 80 parts by mass with respect to 100 parts by mass of the brominated copolymer rubber.

[9] The refrigerant-transporting hose according to any one of [1] to [8], in which the content of the repeating units having bromine constituting the brominated copolymer rubber is from 1.1 to 1.3 mol % with respect to the total amount of the repeating units constituting the brominated copolymer rubber.

[10] The refrigerant-transporting hose according to any one of [1] to [9], in which the outer tube rubber composition further contains a brominated copolymer rubber obtained by brominating a copolymer rubber of isomonoolefin and p-alkylstyrene, the content of the repeating units having bromine constituting the brominated copolymer rubber being less than 0.8 mol % or greater than 1.5 mol % with respect to the total amount of the repeating units constituting the brominated polymer rubber, the content of the carbon black A being 35 parts by mass or greater with respect to 100 parts by mass of the total amount of the brominated copolymer rubber in which the content of the repeating units having bromine constituting the brominated copolymer rubber is from 0.8 to 1.5 mol % with respect to the total amount of the repeating units constituting the brominated copolymer rubber and the brominated copolymer rubber in which the content of the repeating units having bromine constituting the brominated copolymer rubber is less than 0.8 mol % or greater than 1.5 mol % with respect to the total amount of the repeating units having bromine constituting the brominated copolymer rubber.

[11] The refrigerant-transporting hose according to any one of [1] to [10], in which the tensile stress (M100) at 100% elongation of a rubber obtained by crosslinking the outer tube rubber composition is 7 MPa or greater.

[12] The refrigerant-transporting hose according to any one of [1] to [11], in which the inner tube has a plurality of layers, the innermost layer is a rubber layer, and the inner tube has a barrier layer outside the innermost layer.

[13] The refrigerant-transporting hose according to [12], in which the barrier layer contains a polyamide resin.

[14] The refrigerant-transporting hose according to any one of [1] to [13], in which the reinforcing layer is a plurality of reinforcing layers.

[15] The refrigerant-transporting hose according to any one of [1] to [14], which is a refrigerant-transporting hose for an automobile.

Advantageous Effects of Invention

The refrigerant-transporting hose of the present invention can achieve both workability and sealing property at an excellent level.

DESCRIPTION OF EMBODIMENTS

Figure 1:
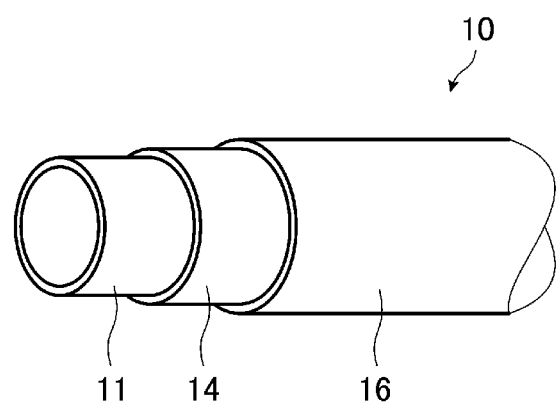
FIG. 1 is a schematic perspective view showing an example of the refrigerant-transporting hose of the present invention with each layer cut away.

Embodiments of the present invention will be described in detail below.

Note that in the present specification, numerical ranges indicated using "(from) . . . to . . . " include the former number as the lower limit value and the latter number as the upper limit value.

In the present specification, unless otherwise noted, a single corresponding substance may be used for each component, or a combination of two or more types of corresponding substances may be used for each component. When a component contains two or more types of substances, the content of the component means the total content of the two or more types of substances.

In the present specification, the fact that at least one of workability and sealing property is more excellent means that the effect of the present invention is more excellent.

Refrigerant-Transporting Hose

The refrigerant-transporting hose of the present invention is a refrigerant-transporting hose including an inner tube, an outer tube, and a reinforcing layer between the inner tube and the outer tube, the outer tube being formed of an outer tube rubber composition, the outer tube rubber composition containing a brominated copolymer rubber obtained by brominating a copolymer rubber of isomonoolefin and p-alkylstyrene, the content of the repeating units having bromine constituting the brominated copolymer rubber being from 0.8 to 1.5 mol % with respect to the total amount of the repeating units constituting the brominated copolymer rubber, a carbon black A having a dibutyl phthalate absorption amount of 40 cm$^3$/100 g or less, a brominated alkylphenol resin, and zinc oxide, the content of the carbon black A being 35 parts by mass or greater with respect to 100 parts by mass of the brominated copolymer rubber.

The hose of the present invention is thought to achieve desired effects as a result of having the above configuration. Although the reason is not clear, it is assumed to be as follows.

The present inventors have found that the sealing property (hose sealing performance) of the caulked portion can be enhanced in a configuration in which the modulus of the rubber forming the outer tube is high.

When the outer tube is connected to a pipe by caulking the outer tube with a fastener, it is considered that the larger the reaction force of the outer tube with respect to the force from the fastener (that is, the higher the modulus of the rubber forming the outer tube), the better the sealing property of the caulked portion.

On the other hand, in a configuration in which the same rubber as the above is used for the inner tube, the force applied from the fastener to the hose passes through the outer tube and the reinforcing layer, so that the force from the fastener is not directly applied to the inner tube, and it is thus considered that the sealing property of the caulked portion is not stable.

Further, the increase in the modulus of the rubber forming the outer tube correlates with the increase in the viscosity of the rubber composition (uncrosslinked) forming the outer tube. There was a concern that the workability at the time of producing a hose would deteriorate due to the increase in the viscosity of the rubber composition (uncrosslinked) as described above.

With respect to the above problems, the present inventors have found that the increase in viscosity of the rubber composition (uncrosslinked) can be suppressed and excellent workability during producing a refrigerant-transporting hose or the like is achieved while increasing the modulus of the outer tube (the rubber that constitutes the outer tube) to improve the sealing property (hose sealing performance) at the joint between the refrigerant-transporting hose and the pipe by using a rubber composition containing a brominated copolymer rubber having a content of repeating units having bromine within a predetermined range and a predetermined content of carbon black having a dibutyl phthalate (DBP) absorption amount within a predetermined range, to form an outer tube of a refrigerant-transporting hose.

For the above reasons, it is considered that the hose of the present invention can achieve both excellent workability and sealing property at an excellent level.

The hose of the present invention is described in detail below.

An example of the hose of the present invention will be described with reference to the accompanying drawings. However, the present invention is not limited to the attached drawings.

FIG. 1 is a schematic perspective view showing an example of the refrigerant-transporting hose of the present invention with each layer cut away.

In FIG. 1, a refrigerant-transporting hose 10 includes an inner tube 11 and an outer tube 16, and has a reinforcing layer 14 between the inner tube 11 and the outer tube 16.

The outer tube 16 is formed of at least the outer tube rubber composition.

Figure 2:
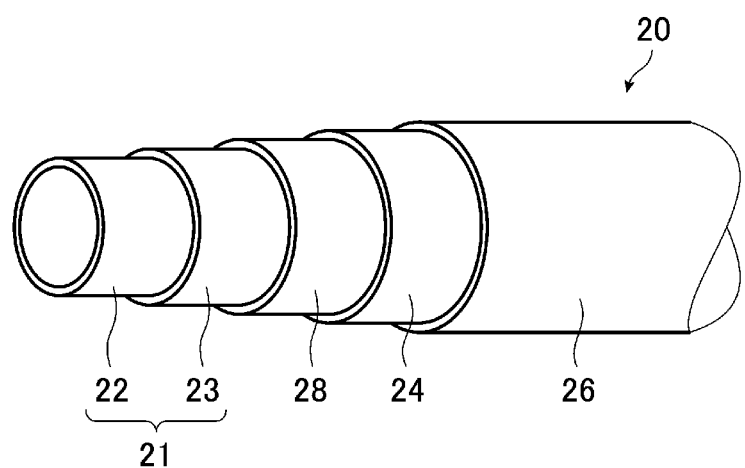
FIG. 2 is a schematic perspective view showing another example of the refrigerant-transporting hose of the present invention with each layer cut away.

FIG. 2 is a schematic perspective view showing another example of the refrigerant-transporting hose of the present invention with each layer cut away.

In FIG. 2, a refrigerant-transporting hose (hose) 20 includes an inner tube 21 and an outer tube 26, and has a reinforcing layer 24 between the inner tube 21 and the outer tube 26. Further, the hose 20 has an intermediate rubber layer 28 between the inner tube 21 and the reinforcing layer 24.

In FIG. 2, the inner tube 21 has a plurality of layers (an innermost layer 22 and a barrier layer 23), and the barrier layer 23 is provided outside the innermost layer 22.

The outer tube 26 is formed of at least the outer tube rubber composition.

Figure 3:
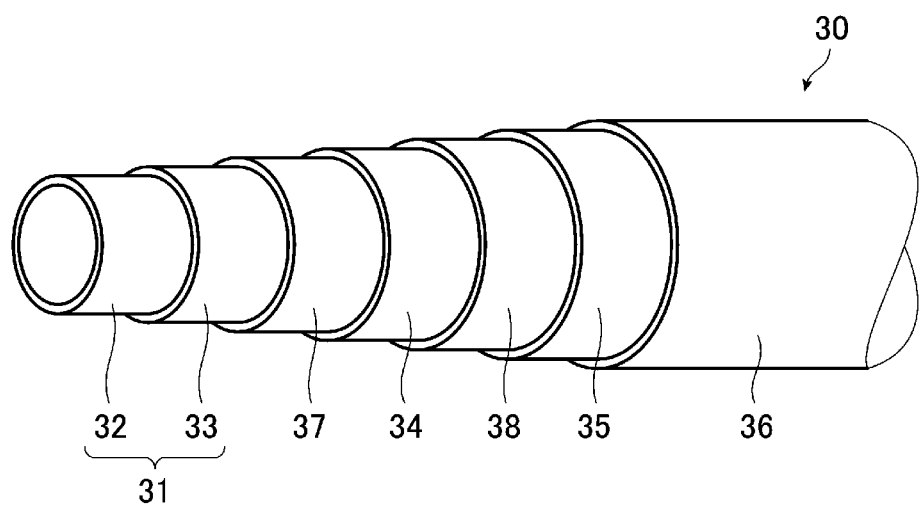
FIG. 3 is a schematic perspective view showing another example of the refrigerant-transporting hose of the present invention with each layer cut away.

FIG. 3 is a schematic perspective view showing another example of the refrigerant-transporting hose of the present invention with each layer cut away.

In FIG. 3, a refrigerant-transporting hose (hose) 30 has an inner tube 31 and an outer tube 36, and has reinforcing layers 34 and 35 between the inner tube 31 and the outer tube 36 as a plurality of reinforcing layers.

The inner tube 31 has a plurality of layers (an innermost layer 32 and a barrier layer 33), and has the barrier layer 33 outside the innermost layer 32.

The hose 30 includes an intermediate rubber layer 37, the reinforcing layer 34, an intermediate rubber layer 38, the reinforcing layer 35, and the outer tube 36 in order from the inner tube 31.

The outer tube 36 is formed of at least the outer tube rubber composition.

The outer diameter of the hose of the present invention is not particularly limited, but may be, for example, from 4 to 30 mm.

The inner diameter of the hose of the present invention is not particularly limited, but may be, for example, from 3 to 20 mm.

Outer Tube

The hose of the present invention has an outer tube.

The thickness of the outer tube is not particularly limited, but may be, for example, from 0.5 to 4 mm.

In the present invention, the outer tube is formed of the outer tube rubber composition described below.

In a configuration in which the outer tube is a single layer, it is only required that the single-layer outer tube (the outermost layer of the hose) is formed of the outer tube rubber composition.

In a configuration in which the outer tube has a plurality of layers, it is only required that any one or more layers of the plurality of layers is formed of the outer tube rubber composition described below. In a configuration in which the outer tube has a plurality of layers, one of the preferable modes is that, in the outer tube, at least the outermost layer (the outermost layer of the hose) is formed of the outer tube rubber composition described below.

Outer Tube Rubber Composition

The outer tube rubber composition forming the outer tube is a rubber composition that contains a brominated copolymer rubber obtained by brominating a copolymer rubber of isomonoolefin and p-alkylstyrene, the content of the repeating units having bromine constituting the brominated copolymer rubber being from 0.8 to 1.5 mol % with respect to the total amount of the repeating units constituting the brominated copolymer rubber, carbon black A having a dibutyl phthalate absorption amount of 40 $cm^3$/100 g or less, a brominated alkylphenol resin, and zinc oxide, the content of the carbon black A being 35 parts by mass or greater with respect to 100 parts by mass of the brominated copolymer rubber, and is used for forming an outer tube of the refrigerant-transporting hose of the present invention.

Hereinafter, each component contained in the outer tube rubber composition will be described.

Brominated Copolymer Rubber

The outer tube rubber composition contains a brominated copolymer rubber obtained by brominating a copolymer rubber of isomonoolefin and p-alkylstyrene, the content of the repeating units having bromine constituting the brominated copolymer rubber being from 0.8 to 1.5 mol % with respect to the total amount of the repeating units constituting the brominated copolymer rubber.

In the present specification, the brominated copolymer rubber obtained by brominating a copolymer rubber of isomonoolefin and p-alkylstyrene, the content of the repeating units having bromine constituting the brominated copolymer rubber being from 0.8 to 1.5 mol % with respect to the total amount of the repeating units constituting the brominated copolymer rubber may be referred to as a "specific brominated copolymer rubber".

In the present invention, the outer tube rubber composition contains a specific brominated copolymer rubber.

The isomonoolefin can be present as a repeating unit constituting the copolymer rubber in the copolymer rubber of isomonoolefin and p-alkylstyrene (before bromination). The same applies to the p-alkylstyrene described above.

The specific brominated copolymer rubber can be referred to as a brominated copolymer of isomonoolefin and p-alkylstyrene.

In the present specification, a brominated copolymer rubber obtained by brominating a copolymer rubber of isomonoolefin and p-alkylstyrene may be simply referred to as "brominated copolymer rubber" regardless of the content of the repeating units having bromine constituting the brominated copolymer rubber.

Further, as described above, a brominated copolymer rubber in which the content of the repeating units having bromine constituting the brominated copolymer rubber is within a predetermined range is referred to as a "specific brominated copolymer rubber". On the other hand, as described later, the brominated copolymer rubber in which the content of the repeating units having bromine constituting the brominated copolymer rubber is out of the predetermined range may be referred to as "another brominated copolymer rubber".

Of all the repeating units constituting the specific brominated copolymer rubber (or the brominated copolymer of isomonoolefin and p-alkylstyrene; the same applies hereinafter), which repeating unit is brominated is not particularly limited. For example, in a preferred embodiment, some of the repeating units of the above-mentioned p-alkylstyrene of the above-mentioned copolymer rubber are brominated. That is, in the above case, the specific brominated copolymer rubber can have, for example, repeating units of isomonoolefin, repeating units of unbrominated p-alkylstyrene, and repeating units of brominated p-alkylstyrene.

Isomonoolefin

The isomonoolefin constituting the specific brominated copolymer rubber is a hydrocarbon compound having a $C^*$—$(CH_3)_2$ branched structure at one end, and one double bond at another end. In a case where the isomonoolefin has 4 carbon atoms, the $C^*$ in the $C^*$—$(CH_3)_2$ can form a double bond.

Carbon Number

The carbon number of the isomonoolefin is preferably from 4 to 7, and more preferably 4, from the viewpoint of being more excellent in the effect of the present invention.

Examples of the isomonoolefin include isobutylene (isobutene; 2-methyl-1-propene), 3-methyl-1-butene (isopentene), 4-methyl-1-pentene (isohexene), and 5-methyl-1-hexene (isoheptene).

Among these, isobutylene is preferable as the isomonoolefin, from the viewpoint of achieving more excellent effect of the present invention.

p-Alkylstyrene

The p-alkylstyrene constituting the specific brominated copolymer rubber is styrene having an alkyl group at the p-position.

As a preferred embodiment, in the specific brominated copolymer rubber, some of the repeating units by the p-alkylstyrene are brominated in the alkyl group of the p-alkylstyrene.

Examples of the alkyl group contained in the p-alkylstyrene include an alkyl group having from 1 to 8 carbon atoms such as a methyl group and an ethyl group.

Among these, the p-alkylstyrene is preferably p-methylstyrene from the viewpoint of achieving more excellent effect of the present invention.

Content of Repeating Units Having Bromine

In the present invention, regarding the brominated copolymer rubber (specific brominated copolymer rubber) obtained by brominating a copolymer rubber of isomonoolefin and p-alkylstyrene contained in the outer tube rubber composition, the content of the repeating units having bromine constituting the brominated copolymer rubber (specific brominated copolymer rubber) is from 0.8 to 1.5 mol % with respect to the total amount of the repeating units constituting the brominated copolymer rubber (specific brominated copolymer rubber).

The content of the repeating units having bromine constituting the specific brominated copolymer rubber is preferably from 1.1 to 1.3 mol % with respect to the total amount of the repeating units constituting the specific brominated copolymer rubber, from the viewpoint of being superior to the effects of the present invention.

It is sufficient that the outer tube rubber composition contains the specific brominated copolymer rubber as a rubber component.

The specific brominated copolymer rubber may be used alone or in combination of two or more.

Another Brominated Copolymer Rubber

The outer tube rubber composition may further contain, as a rubber component, another brominated copolymer rubber, which has a different content of the repeating units having bromine from the specific brominated copolymer rubber (hereinafter, another brominated copolymer rubber as described above may be referred to as "another brominated copolymer rubber"), in addition to the specific brominated copolymer rubber.

In the another brominated copolymer rubber, it is only required that the content of the repeating units having bromine that constitute another brominated copolymer rubber is outside the predetermined range of the repeating units having bromine contained in the specific brominated copolymer rubber.

Examples of the another brominated copolymer rubber include brominated copolymer rubber in which the content of the repeating units having bromine constituting the another brominated copolymer rubber is less than 0.8 mol % or greater than 1.5 mol % with respect to the total amount of the repeating units constituting the another brominated copolymer rubber.

The another brominated copolymer rubber may be the same or different from the specific brominated copolymer rubber except that the content of the repeating units having bromine is different, as long as the copolymer rubber of isomonoolefin and p-alkylstyrene is a brominated copolymer rubber.

In a case where the content of the repeating units having bromine in the another brominated copolymer rubber is less than 0.8 mol %, the lower limit of the content may be, for example, 0.1 mol % or greater with respect to the total amount of the repeating units constituting the another brominated copolymer rubber.

In the another brominated copolymer rubber, in a case where the content of the repeating units having bromine is more than 1.5 mol %, the upper limit of the content may be, for example, 3.0 mol % or less with respect to the total amount of the repeating units constituting the other brominated copolymer rubber.

In a configuration in which the outer tube rubber composition contains another brominated copolymer rubber (different brominated copolymer rubber) having a different content of the repeating unit having bromine from the above-mentioned specific brominated copolymer rubber, the total content of the repeating units having bromine constituting the specific brominated copolymer rubber and the another brominated copolymer rubber is not particularly limited, but is preferably from 0.8 to 1.5 mol % and more preferably from 1.1 to 1.3 mol % on average with respect to the total amount of all the repeating units constituting the specific brominated copolymer rubber and the another brominated copolymer rubber.

Content of Specific Brominated Copolymer Rubber

In the outer tube rubber composition, it is preferable that all of the brominated copolymer rubbers are the specific brominated copolymer rubbers, and it is more preferable that all of the rubber components are the specific brominated copolymer rubbers.

In a configuration in which the outer tube rubber composition contains the specific brominated copolymer rubber and the another brominated copolymer rubber as brominated copolymer rubbers, the content of the specific brominated copolymer rubber is preferably 50 mass % or greater, more preferably 80 mass % or greater, and even more preferably 90 mass % or greater and less than 100 mass % with respect to the total content of the specific brominated copolymer rubber and the another brominated copolymer rubber (total amount of brominated copolymer rubber), from the viewpoint of achieving more excellent effect of the present invention, In a configuration in which the brominated copolymer rubber contains the specific brominated copolymer rubber and the another brominated copolymer rubber, all of the brominated copolymer rubber or rubber component may be the specific brominated copolymer rubber and the another brominated copolymer rubber.

The method for producing the brominated copolymer rubber is not particularly limited. Examples thereof include known methods.

For example, in a case where a brominated copolymer rubber is produced by copolymerizing the isomonoolefin and the p-alkylstyrene to obtain a copolymer rubber, and then brominating the copolymer rubber, the brominated copolymer rubber can be produced from the copolymer rubber before bromination containing, for example, from 0.5 to 10 mol % of p-alkylstyrene (repeating unit thereof), by converting, for example, from 5 to 30% of the p-alkylstyrene into bromoalkylstyrene (repeating unit thereof). By adjusting the conversion, the specific brominated copolymer rubber or the another brominated copolymer rubber can be produced.

A commercial product may be used as a brominated copolymer rubber.

Examples of the specific brominated copolymer rubber include Exxpro 3745 (manufactured by ExxonMobil Chemical Company).

Examples of the another brominated copolymer rubber include Exxpro 3433 and Exxpro 3035 (both of which are manufactured by ExxonMobil Chemical Company; the content of the repeating units having bromine is less than 0.8 mol %).

Carbon Black A

In the present invention, the outer tube rubber composition contains carbon black A.

Dibutyl Phthalate (DBP) Absorption Amount of Carbon Black A

In the present invention, the dibutyl phthalate (DBP) absorption amount of carbon black A is 40 $cm^3/100$ g or less.

The DBP absorption amount of carbon black A is preferably from 10 to 35 $cm^3/100$ g, from the viewpoint of achieving more excellent effect of the present invention and excellent elongation at break of the obtained rubber In the present invention, the amount of dibutyl phthalate absorbed by carbon black can be measured in accordance with JIS K 6217-4:2008.

In addition, when the DBP absorption amount of a certain carbon black is described in the numerical range, in a case where the entire numerical range described above corresponds to 40 $cm^3/100$ g or less, or in a case where the average value of the upper limit and the lower limit of the above numerical range is 40 $cm^3/100$ g or less, the carbon black shall correspond to carbon black A. The same applies to the iodine adsorption amount of carbon black A described later.

The same applies to carbon blacks other than carbon black A (for example, carbon black B described later).

Iodine Adsorption Amount of Carbon Black A

The iodine adsorption amount of the carbon black A is preferably from 10 to 40 g/kg.

In the present invention, the iodine adsorption amount of carbon black can be measured in accordance with JIS K 6217-1:2008.

The carbon black A is preferably FTF (fine thermal furnace) carbon black, from the viewpoint of achieving more excellent effect of the present invention and excellent elongation at break of the obtained rubber Carbon Black A Content In the present invention, the content of the carbon black A is 35 parts by mass or greater with respect to 100 parts by mass of the specific brominated copolymer rubber.

The content of the carbon black A is preferably 170 parts by mass or less, more preferably from 60 to 85 parts by mass, and even more preferably from 65 to 75 parts by mass with respect to 100 parts by mass of the specific brominated copolymer rubber, from the viewpoint of achieving more excellent effect of the present invention and excellent in elongation at break and 100% modulus of the obtained rubber.

In the present invention, in a configuration in which the outer tube rubber composition contains the specific brominated copolymer rubber as the brominated copolymer rubber, the reference of the content of carbon black A is "100 parts by mass of the specific brominated copolymer rubber".

Further, in a configuration in which the outer tube rubber composition contains the specific brominated copolymer rubber and the another brominated copolymer rubber as the brominated copolymer rubber, the content of carbon black A may be defined with the reference of the content of carbon black A as "total content of the specific brominated copolymer rubber and the other brominated copolymer rubber is 100 parts by mass".

In a configuration in which the outer tube rubber composition further contains another brominated copolymer rubber other than the specific brominated copolymer rubber, the content of the carbon black A is preferably 35 parts by mass or greater, more preferably from 60 to 85 parts by mass, and even more preferably from 65 to 75 parts by mass with respect to the total content of 100 parts by mass of the specific brominated copolymer rubber and the another brominated copolymer rubber, from the viewpoint of achieving more excellent effect of the present invention and excellent elongation at break and 100% modulus of the obtained rubber.

In the present specification, with respect to the reference of the contents of the components other than carbon black A (for example, brominated alkylphenol resin, zinc oxide, carbon black B, and talc), the reference of the contents of the components other than carbon black A may be referred to as "100 parts by mass of the specific brominated copolymer rubber" or "100 parts by mass of the total content of the specific brominated copolymer rubber and the other brominated copolymer rubber", which may be collectively referred to as "100 parts by mass of the specific brominated copolymer rubber and the like".

Carbon Black B

The outer tube rubber composition preferably further contains carbon black B having a dibutyl phthalate (DBP) absorption amount from 50 to 80 cm$^3$/100 g, from the viewpoint of achieving more excellent effect of the present invention and excellent elongation at break and 100% modulus of the obtained rubber.

Iodine Adsorption Amount of Carbon Black B

The iodine adsorption amount of the carbon black B is preferably from 15 to 30 g/kg, from the viewpoint of achieving more excellent effect of the present invention and excellent elongation at break and 100% modulus of the obtained rubber.

Carbon Black B

The carbon black B is preferably SRF (Semi-Reinforcing Furnace) carbon black, from the viewpoint of achieving more excellent effect of the present invention and excellent elongation at break and 100% modulus of the obtained rubber.

Carbon Black B Content

The content of the carbon black B is preferably from 20 to 120 parts by mass with respect to 100 parts by mass of the specific brominated copolymer rubber, from the viewpoint of achieving more excellent effect of the present invention and excellent elongation at break and 100% modulus of the obtained rubber.

The content of the carbon black B is preferably 20 parts by mass or greater and less than 95 parts by mass, more preferably from 30 to 70 parts by mass, and even more preferably from 40 to 60 parts by mass with respect to 100 parts by mass of the specific brominated copolymer rubber, from the viewpoint of achieving more excellent effect of the present invention and excellent elongation at break and 100% modulus of the obtained rubber.

Brominated Alkylphenol Resin

The outer tube rubber composition contains a brominated alkylphenol resin.

The brominated alkyl phenolresin can function as a crosslinking aid of the brominated copolymer rubber.

The brominated alkylphenol resin is a condensate of brominated alkylphenol and formaldehyde.

The brominated alkylphenol resin may be a condensate of brominated alkylphenol, phenol and formaldehyde.

The content of the brominated alkylphenol resin is preferably from 1 to 10 parts by mass, and more preferably from 2 to 5 parts by mass with respect to 100 parts by mass of the specific brominated copolymer rubber, from the viewpoint of achieving more excellent effect of the present invention and excellent elongation at break and 100% modulus of the obtained rubber.

Zinc Oxide

The outer tube rubber composition contains zinc oxide (ZnO).

The zinc oxide can function as a crosslinking agent for the brominated copolymer rubber.

The content of the zinc oxide is preferably from 0.5 to 10 parts by mass, and more preferably from 1 to 5 parts by mass with respect to 100 parts by mass of the specific brominated copolymer rubber, from the viewpoint of achieving more excellent effect of the present invention and excellent elongation at break and 100% modulus of the obtained rubber.

Talc

The outer tube rubber composition preferably further contains talc, from the viewpoint of achieving more excellent effect of the present invention.

Talc is a mineral composed of magnesium hydroxide and silicate, and is a compound represented by $Mg_3Si_4O_{10}(OH)_2$.

The content of the talc is preferably from 10 to 80 parts by mass with respect to 100 parts by mass of the specific brominated copolymer rubber, from the viewpoint of being more excellent in the effect of the present invention.

The content of the above talc is preferably from 10 to 50 parts by mass, and more preferably from 20 to 40 parts by mass with respect to 100 parts by mass of the specific brominated copolymer rubber, from the viewpoint of achieving more excellent effect of the present invention.

Additives

The outer tube rubber composition may further contain an additive, as necessary, within a range not impairing the effects of the present invention.

Examples of the additive include rubbers other than the specific brominated copolymer rubber and the another brominated copolymer rubber, resins, carbon blacks other than the carbon blacks A and B, white fillers other than talc, crosslinking agents other than zinc oxide, crosslinking accelerators (for example, stearic acid and zinc stearate), crosslinking retarders, processing aids such as softening agents, antiaging agents, and plasticizers.

Method for Producing Outer Tube Rubber Composition

The method for producing the outer tube rubber composition is not particularly limited. For example, the outer tube rubber composition can be produced by mixing the above-mentioned essential components and optional components that can be used if necessary at 20 to 180° C.

Since the outer tube rubber composition has a low Mooney viscosity, it is excellent in workability in producing a hose (for example, extrudability), and also in workability in producing the outer tube rubber composition itself (for example, mixing workability).

Crosslinking of Rubber Composition

The method for crosslinking the rubber composition of the present invention is not particularly limited. The rubber composition of the present invention can be crosslinked by, for example, press-crosslinking, steam-crosslinking, oven-crosslinking (hot-air crosslinking), or hot-water crosslinking at 140 to 190° C.

In the present invention, to crosslink the rubber composition of the present invention means to crosslink and cure the rubber composition (uncrosslinked) of the present invention. Specifically, it is only required that the brominated copolymer rubber is crosslinked.

Crosslinking of the brominated copolymer rubber means that the specific brominated copolymer rubber is intramolecularly bound in the brominated copolymer rubber, bonds with each other, or bonded to a rubber other than the brominated copolymer rubber described below by forming a single bond or a linking group. The linking group is not particularly limited.

Specific examples of crosslinking of the brominated copolymer rubber will be described below by showing reaction formulas. The reaction formula shown below is an example of crosslinking of the brominated copolymer rubber, and the present invention is not limited to the reaction formula below.

As shown in the following reaction formula, for example, the brominated copolymer rubber can be crosslinked intramolecularly or intermolecularly by reacting the methyl bromide group in the brominated copolymer rubber (left) with the tolyl group of the brominated copolymer rubber (right) in the presence of zinc oxide and/or zinc stearate to cause dehydrobromination to form a methylene group.

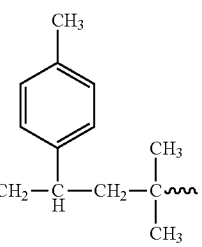

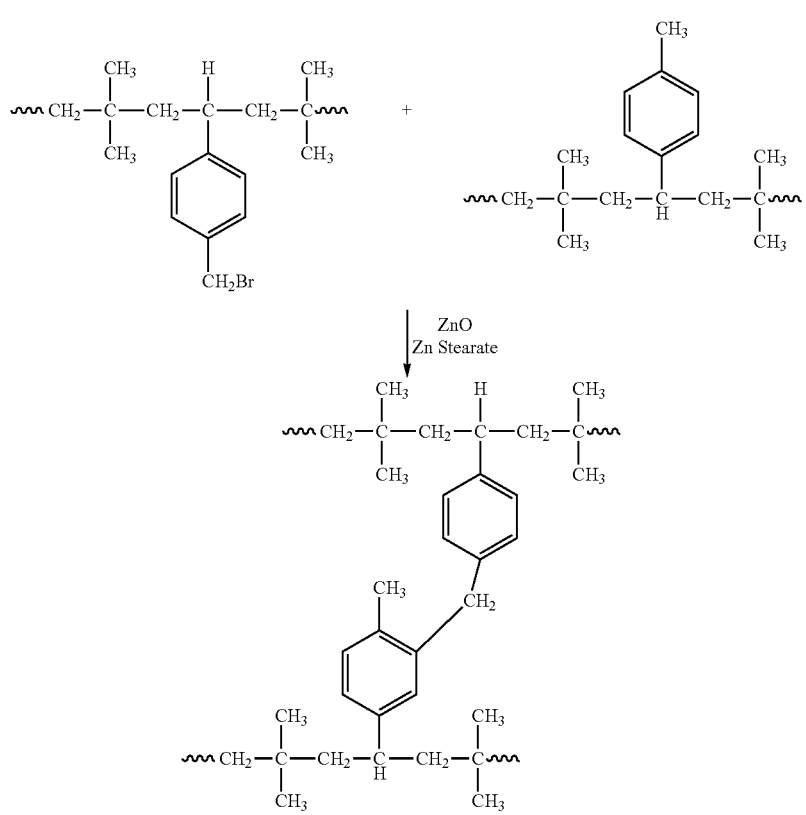

[Chemical Formula 1]

The tensile stress (M100) at 100% elongation of the rubber obtained by crosslinking the outer tube rubber composition is preferably 7 MPa or greater, and more preferably from 9 to 15 MPa, from the viewpoint of achieving more excellent effect (particularly, the sealing property) of the present invention.

Regarding the measurement of M100 in the present invention, first, the outer tube rubber composition is crosslinked for 45 minutes under a pressure of 3.0 MPa at 153° C., thus producing 2 mm thick rubber. Then, using the rubber obtained as described above, a tensile test was performed in accordance with JIS K6251:2017 at 23° C. and a tensile speed of 500 mm/min, and the tensile stress (M100) at 100% elongation of the rubber was measured.

Inner Tube

The hose of the present invention has an inner tube.

The thickness of the inner tube is not particularly limited, but may be, for example, from 0.2 to 3 mm.

The inner tube may be a single layer or may include a plurality of layers.

In a configuration in which the inner tube is a single layer, the single layer inner tube may be formed of a rubber layer or a resin layer.

Rubber Composition Capable of Forming an Inner Tube

In a configuration in which the inner tube is a single layer and the single-layer inner tube is a rubber layer, the rubber composition capable of forming the rubber layer is not particularly limited. Examples thereof include known ones.

Examples of the rubber contained in the rubber composition used for the inner tube include acrylonitrile-butadiene rubber (NBR), natural rubber (NR), butadiene rubber (BR), styrene-butadiene copolymer rubber (SBR), polyisoprene rubber (IR), butyl rubber (IIR), chlorobutyl rubber (Cl-IIR), bromobutyl rubber (Br-IIR), chloroprene rubber, ethylene-propylene copolymer rubber, styrene-isoprene copolymer rubber, styrene-isoprene-butadiene copolymer rubber, isoprene-butadiene copolymer rubber, chlorosulfonated polyethylene, and chlorinated polyethylene (CM).

Among these, the rubber preferably contains butyl rubber (IIR) and/or chlorinated polyethylene (CM), from the viewpoint of achieving excellent fatigue resistance of the rubber layer.

Resin Composition Capable of Forming Inner Tube

The resin layer is preferably formed of a resin composition containing a polyamide resin, from the viewpoint of achieving excellent refrigerant permeation resistance and the like.

Examples of the polyamide resin include polyamide resins such as nylon 11, nylon 12, nylon 6, nylon 66, nylon 666, nylon 612, nylon 610, nylon 46, and nylon 66612.

The polyamide resin may be, for example, a blend of the above polyamide resin and a carboxyl group-containing modified polyolefin (a modified polyolefin having a carboxyl group: —COOH).

The resin composition may further contain, in addition to the polyamide resin, additives that are commonly blended to resin compositions, such as fillers such as carbon black and silica; vulcanizing agents or crosslinking agents, vulcanization accelerators or crosslinking accelerators, oils, and antioxidants. The compounding amount of the additive may be appropriately selected within the range not deviating from the object of the present invention.

It is preferable that the inner tube has a plurality of layers, and the inner tube has a barrier layer outside the innermost layer, from the viewpoint of achieving excellent refrigerant permeation resistance and the like.

The barrier layer is preferably adjacent to the innermost layer.

Innermost Layer

The innermost layer is preferably a rubber layer.

The rubber composition capable of forming the innermost layer is not particularly limited. Examples thereof include known ones. Examples of the rubber composition capable of forming the innermost layer include those similar to the above-mentioned "(rubber composition capable of forming inner tube)".

Barrier Layer

The barrier layer can be formed of, for example, a resin composition similar to the above-mentioned "(resin composition capable of forming inner tube)".

The barrier layer preferably contains a polyamide resin, from the viewpoint of achieving excellent refrigerant permeation resistance and the like.

Examples of the polyamide resin contained in the barrier layer include the same polyamide resins as described above.

Reinforcing Layer

The hose of the present invention has a reinforcing layer between the inner tube and the outer tube.

Since the hose of the present invention has the reinforcing layer, it is excellent in sealing property (hose sealing property), can maintain the strength of the hose, and is excellent in pressure resistance.

The thickness of the reinforcing layer is not particularly limited, but may be, for example, from 0.3 to 3 mm.

The reinforcing material that is capable of forming the reinforcing layer is not particularly limited. Examples thereof include known methods.

Examples of the material of the reinforcing layer (reinforcing material) include polymers (fiber materials) and metals.

Specific examples of the polymer (fiber material) include polyester, polyamide, aramid, vinylon, rayon, PBO (polyparaphenylene benzobisoxazole), polyketone, polyarylate, and polyketone.

Examples of the metal include hard steel wires such as brass-plated wires and galvanized wires.

The reinforcing layer is preferably polyester, more preferably polyester fiber, from the viewpoint of achieving excellent fatigue resistance of the reinforcing layer and excellent cost performance.

The reinforcing material may be surface-treated.

Examples of the form of the reinforcing layer (reinforcing material) include those braided into a spiral structure and/or a braid structure.

The form of the reinforcing layer (reinforcing material) is preferably those braided into a spiral structure and/or a braid structure.

The reinforcing layer included in the hose of the present invention may be either a single reinforcing layer or a plurality of reinforcing layers.

The reinforcing layer is preferably a plurality of reinforcing layers (the hose of the present invention has a plurality of reinforcing layers as the reinforcing layer), from the viewpoint of increasing the strength of the refrigerant-transporting hose.

In a configuration in which the reinforcing layer is a plurality of reinforcing layers, the number of the reinforcing layers may be 2 or more and may be 5 or less. In a configuration in which the reinforcing layer is a plurality of reinforcing layers, the number of the reinforcing layers is preferably from 2 to 3, from the viewpoint of increasing the strength of the refrigerant transporting hose.

Intermediate Rubber Layer The hose of the present invention may further have an intermediate rubber layer. The intermediate rubber layer can bond the members existing on both sides of the intermediate rubber layer.

The intermediate rubber layer may be present, for example, between the inner tube and the reinforcing layer, between the reinforcing layer and the outer tube, or between the innermost layer and the barrier layer.

In a configuration in which the hose of the present invention has a plurality of reinforcing layers as the reinforcing layer, the intermediate rubber layer may be present between the reinforcing layers in addition to the above.

The intermediate rubber layer is preferably present between the inner tube and the reinforcing layer, from the viewpoint of achieving excellent refrigerant permeation resistance and the like. In a configuration in which the hose of the present invention has a plurality of reinforcing layers as the reinforcing layer, the intermediate rubber layer is preferably present between the reinforcing layers in addition to the above.

The rubber composition capable of forming the intermediate rubber layer is not particularly limited. Examples thereof include known methods.

Examples of the rubber contained in the rubber composition used for the intermediate rubber layer include acrylonitrile-butadiene rubber (NB R), natural rubber (NR), butadiene rubber (BR), styrene-butadiene copolymer rubber (SBR), polyisoprene rubber (IR), butyl rubber (IIR), chlorobutyl rubber (Cl-IIR), bromobutyl rubber (Br-IIR), chloroprene rubber, ethylene-propylene copolymer rubber, styrene-isoprene copolymer rubber, styrene-isoprene-butadiene copolymer rubber, isoprene-butadiene copolymer rubber, chlorosulfonated polyethylene, and chlorinated polyethylene (CM).

Among these, the rubber preferably contains butyl rubber (IIR) and/or chlorinated polyethylene (CM), from the viewpoint of achieving excellent fatigue resistance of the rubber layer.

The thickness of the intermediate rubber layer may be, for example, from 0.2 to 0.7 mm.

The intermediate rubber layer can function, for example, as an adhesive agent for adhering two adjacent layers via the intermediate rubber layer.

The rubber composition capable of forming the inner tube or the intermediate rubber layer may further contain, in addition to the above rubber, additives such as fillers such as carbon black; vulcanizing agents, crosslinking agents, vulcanization accelerators, zinc oxide, crosslinking accelerators (for example, stearic acid and zinc stearate), crosslinking retarders, processing aids such as softening agents, antiaging agents, and plasticizers. The content of the above-mentioned additive can be appropriately selected within the range not deviating from the object of the present invention.

Hose Producing Method

The method of producing the hose of the present invention is not particularly limited. For example, the hose of the present invention can be produced by layering a rubber composition and/or resin composition for forming an inner tube, a reinforcing material for forming a reinforcing layer, an outer tube rubber composition for forming an outer tube, and a rubber composition for forming an intermediate rubber layer, which can be used as necessary, on a mandrel to form a layered body in the desired form of hose, and crosslinking the layered body by press-crosslinking, steam crosslinking, oven crosslinking (hot-air crosslinking), or warm water crosslinking at 140 to 190° C. for 30 to 180 minutes.

In the above, the hose of the present invention may be produced by coating the layered body before crosslinking with a protective film such as polymethyl terpene, crosslinking the coated layered body as described above, and then peeling the protective film from the layered body.

The hose of the present invention can be used as a refrigerant-transporting hose.

Specific applications of the hose of the present invention include, for example, a car air conditioner system hose and an indoor air conditioner system hose.

EXAMPLE

The present invention is described below in detail using examples but the present invention is not limited to such examples.

Production of Outer Tube Rubber Composition

Using the components shown in Table 1 below in the composition (parts by mass) shown in the same table, these were mixed with a stirrer at 20 to 90° C. for 5 minutes to produce an outer tube rubber composition.

Measurement of Mooney Viscosity

The Mooney viscosity of each outer tube rubber composition manufactured as described above was measured in accordance with JIS K6300-1:2013, using an L-shaped rotor under the conditions of a preheating time of 1 minute, a rotor rotation time of 4 minutes, and a test temperature of 125° C. The results are shown in Table 1.

Evaluation Criteria for Workability Based on Mooney Viscosity

In a case where the Mooney viscosity measured as described above was less than 65, it was evaluated as excellent in workability (for example, extrudability) during the production of the refrigerant-transporting hose.

In a case where the Mooney viscosity was smaller than 65, the workability was evaluated superior.

In a case where the Mooney viscosity was 65 or greater, the workability was evaluated as poor.

Production of Crosslinked Sheet

Each of the outer tube rubber compositions obtained as described above was crosslinked at a surface pressure of 3.0 MPa for 45 minutes using a press molding machine at 153° C. to form a crosslinked sheet having a thickness of 2 mm Production of Initial Test Piece Used for Tensile Test A dumbbell-shaped JIS No. 3 test piece was punched out from each crosslinked sheet produced as described above to obtain an initial test piece.

Tensile Test

Using each of the initial test pieces obtained as described above, a tensile test was performed in accordance with JIS K6251:2017 at 23° C. and a tensile speed of 500 mm/min, and the elongation at break (Eb) [%] and a 100% modulus (tensile stress at 100% elongation; M100) was measured. The results are shown in Table 1.

Elongation at Break (Eb)

In the present invention, in a case where the value of elongation at break is 100% or greater, it can be evaluated as excellent in durability.

100% Modulus

In the present invention, the 100% modulus is preferably 7 MPa or greater. In a case where the 100% modulus is 7 MPa or greater, it is more preferable that the 100% modulus is large.

As will be described later, 100% modulus is considered to have a correlation with the sealing property (hose sealing performance).

Evaluation of Hose Sealing Performance

Each hose was produced according to the following "•Production of hose".

In accordance with SAE (American Society of Automotive Engineers) Standard J3062 5.3 Coupling Integrity, the ends of the hoses produced as described below were respectively connected to joints, and the connecting parts were crimped (caulked) with the connector to obtain a connecting assembly. Next, the connecting assembly was filled with a refrigerant and a refrigerating machine oil (lubricant) described below, and after the filling, the connecting assembly was sealed and subjected to the test exposure described in Section 5.3.2.2. The above test exposure was test option 1. After repeating the predetermined steps a to d four times for the test option 1, the leakage evaluation was performed. In the leak evaluation, the weight of the connecting assembly was measured before and after the test exposure.

The weight for the amount of refrigerant or refrigerating machine oil (leakage amount) leaking from the connecting assembly was calculated based on the result of the weight of the connecting assembly immediately after the test exposure obtained in the leak evaluation.

Based on the leakage amount calculated as described above, the hose sealing performance (sealing property at the joint between the refrigerant-transporting hose and the pipe) was evaluated by the "•Evaluation criteria for hose sealing performance" described later. The results are shown in the column of "Hose sealing performance C.I test" in Table 1.

The details of the hose, refrigerant, and refrigerating machine oil used in the above evaluation are as follows (4. HOSE IDENTIFICATION).

Hose Type: Type C (Barrier, Textile Reinforced)
Hose class: Class I-Not greater than 0.039 g/cm$^2$/year
Inner diameter of hose: 16 mm
Refrigerant: HFO1234yf
Refrigerating machine oil: ND-8 (manufactured by DENSO Corporation)

Production of Hose

The hose used for the above evaluation was produced as follows.

On the surface of a thermoplastic resin mandrel having an outer diameter of 16 mm, a butyl rubber composition A described later was extruded to a thickness of 1.2 mm to form an innermost layer, on the innermost layer, a polyamide resin described below was extruded to a thickness of 0.15 mm to form a barrier layer, on the barrier layer, a butyl rubber composition A described later was extruded to a thickness of 0.2 mm to form a first intermediate rubber layer, on the first intermediate rubber layer, polyethylene terephthalate fibers were alternately wound in a spiral shape to form a first reinforcing layer, on the first reinforcing layer, a butyl rubber composition A described below was extruded to a thickness of 0.2 mm to form a second intermediate rubber layer, on the second intermediate rubber layer, polyethylene terephthalate fibers were alternately wound in a spiral shape to form a second reinforcing layer, on the second reinforcing layer, the outer tube rubber composition produced as described above was extruded to a thickness of 1.3 mm to form an outer tube, and a polymethylpentene resin was further extruded on the outer tube to form an outer cover, thus obtaining a tubular layered body.

The tubular layered body obtained as described above was vulcanized at 160° C. for 100 minutes, and then the outer skin and the mandrel were removed from the tubular layered body to prepare a hose.

The form of the hose produced as described above corresponds to the attached FIG. 3.

Polyamide resin: a blend of polyamide 6 and a carboxyl group-containing modified polyolefin (Zytel ST811HS (trade name), available from DuPont)

Butyl rubber composition A (common to the innermost layer, first and second intermediate rubber layers): a composition containing 100 parts by weight of butyl rubber, 80 parts by weight of carbon black (HAF), 3 parts by weight of stearic acid, 10 parts by weight of paraffin oil, 2 parts by mass of zinc oxide, and 8 parts by mass of brominated alkylphenol formaldehyde resin.

Evaluation Criteria for Hose Sealing Performance

As a result of the leakage evaluation, in a case where the weight of the leakage amount obtained as described above was less than 4.0 g, it was evaluated as being extremely excellent in hose sealing performance (hose sealing property) and was labeled with "Excellent".

In a case where the leakage amount was 4.0 g or greater and less than 5.0 g, it was evaluated as being slightly excellent in hose sealing performance and was labeled with "Yes".

In a case where the leakage amount was 5.0 g or greater, it was evaluated as poor in hose sealing performance and was labeled with "Poor".

Relationship Between Sealing Property (Hose Sealing Performance) and 100% Modulus In the present invention, in a case where the 100% modulus of each initial test piece obtained as described above was 10.0 MPa or greater, the sealing property (hose sealing performance) was very excellent (Excellent).

When the 100% modulus was 7.0 MPa or greater and less than 10.0 MPa, the sealing property was slightly excellent (Yes).

In a case where the 100% modulus was less than 7.0 MPa, the sealing property was poor. (Poor).

Thus, the present inventors have found that the sealing property (hose sealing performance) correlates with 100% modulus, and that the larger the 100% modulus, the smaller the raw data of sealing property (hose sealing performance).

TABLE 1

|  |  | Example 1 | Example 2 | Example 3 | Example 4 | Example 5 | Example 6 | Example 7 | Example 8 |
|---|---|---|---|---|---|---|---|---|---|
| BIMS1 (Specific brominated copolymer rubber) | Br 1.2 mol % PMS 7.5 wt. % isobutylene (C4) | 100 | 100 | 100 | 100 | 100 | 100 | 50 | 50 |
| BIMS2 (Another brominated copolymer rubber) | Br 0.75 mol % PMS 5.0 wt. % isobutylene (C4) |  |  |  |  |  |  | 50 |  |
| BIMS3 (Another brominated copolymer rubber) | Br 0.5 mol % PMS 5.0 wt. % isobutylene (C4) |  |  |  |  |  |  |  | 50 |
| Br-IIR (comparison) | Br 1.8 mol % no p-alkylstyrene |  |  |  |  |  |  |  |  |
| Carbon black B-1 | SRF C.B. DBP64 ± 12 Iodine adsorption amount 23 ± 5 |  | 50 | 50 | 50 |  | 50 | 50 | 50 |
| Carbon black A-1 | FTF C.B DBP 20 to 30 Iodine adsorption amount 20 to 34 | 120 | 80 | 70 | 50 | 120 | 70 | 70 | 70 |
| Carbon black C-1 | HAF C.B. DBP 97 to 107 Iodine adsorption amount 76 to 86 |  |  |  |  |  |  |  |  |
| Talc |  | — |  |  |  | 30 | 30 | 30 | 30 |
| Paraffin oil |  | — | 5 | 5 | 5 | 5 | 5 | 5 | 5 |

TABLE 1-continued

| | | | | | | | | | |
|---|---|---|---|---|---|---|---|---|---|
| Zinc oxide | — | 2 | 2 | 2 | 2 | 2 | 2 | 2 | 2 |
| Stearic acid | — | 2 | 2 | 2 | 2 | 2 | 2 | 2 | 2 |
| Brominated alkylphenol resin | | 3 | 3 | 3 | 3 | 3 | 3 | 3 | 3 |
| Content of repeating units containing bromine (mol %) (In a case where a specific brominated copolymer rubber and another brominated copolymer are used in combination, their average value) | | 1.20 | 1.20 | 1.20 | 1.20 | 1.20 | 1.20 | 0.98 | 0.85 |
| Eb (elongation at break) | % | 170 | 125 | 134 | 154 | 145 | 110 | 163 | 164 |
| M100 (100% modulus) | MPa | 7.1 | 9.5 | 8.9 | 7.3 | 8.0 | 10.5 | 7.9 | 7.3 |
| Hose sealing performance (Sealing property) | C.I test | Yes | Yes | Yes | Yes | Yes | Excellent | Yes | Yes |
| Mooney viscosity | Vis. @125° C. | 61 Yes | 64 Yes | 62 Yes | 60 Yes | 60 Yes | 60 Yes | 59 Yes | 55 Yes |

| | | Example 9 | Example 10 | Comparative Example 1 | Comparative Example 2 | Comparative Example 3 | Comparative Example 4 |
|---|---|---|---|---|---|---|---|
| BIMS1 (Specific brominated copolymer rubber) | Br 1.2 mol % PMS 7.5 wt. % isobutylene (C4) | 100 | 100 | | | | 100 |
| BIMS2 (Another brominated copolymer rubber) | Br 0.75 mol % PMS 5.0 wt. % isobutylene (C4) | | | 100 | | | |
| BIMS3 (Another brominated copolymer rubber) | Br 0.5 mol % PMS 5.0 wt. % isobutylene (C4) | | | | 100 | | |
| Br-IIR (comparison) | Br 1.8 mol % no p-alkylstyrene | | | | | 100 | |
| Carbon black B-1 | SRF C.B. DBP64 ± 12 Iodine adsorption amount 23 ± 5 | 50 | 50 | 50 | 50 | 50 | |
| Carbon black A-1 | FTF C.B DBP 20 to 30 Iodine adsorption amount 20 to 34 | 80 | 50 | 70 | 70 | 70 | |
| Carbon black C-1 | HAF C.B. DBP 97 to 107 Iodine adsorption amount 76 to 86 | | | | | | 60 |
| Talc | — | 30 | 30 | 30 | 30 | 30 | 30 |
| Paraffin oil | — | 5 | 5 | 5 | 5 | 5 | 5 |
| Zinc oxide | — | 2 | 2 | 2 | 2 | 2 | 2 |
| Stearic acid | — | 2 | 2 | 2 | 2 | 2 | 2 |
| Brominated alkylphenol resin | | 3 | 3 | 3 | 3 | 3 | 3 |
| Content of repeating units containing bromine (mol %) (In a case where a | | 1.20 | 1.20 | 0.75 | 0.50 | 1.80 | 1.20 |

TABLE 1-continued

| | | | | | | | |
|---|---|---|---|---|---|---|---|
| specific brominated copolymer rubber and another brominated copolymer are used in combination, their average value) | | | | | | | |
| Eb (elongation at break) | % | 101 | 130 | 219 | 255 | 234 | 160 |
| M100 (100% modulus) | MPa | 11.2 | 9.0 | 5.8 | 4.8 | 4.7 | 6.5 |
| Hose sealing performance (Sealing property) | C.I test | Excellent | Yes | Poor | Poor | Poor | Poor |
| Mooney viscosity | Vis. @125° C. | 62 Yes | 58 Yes | 56 Yes | 50 Yes | 64 Yes | 69 Poor |

| | | Comparative Example 5 | Comparative Example 6 | Comparative Example 7 | Comparative Example 8 | Comparative Example 9 | Comparative Example 10 |
|---|---|---|---|---|---|---|---|
| BIMS1 (Specific brominated copolymer rubber) | Br 1.2 mol % PMS 7.5 wt. % isobutylene (C4) | 100 | 100 | 100 | 100 | 100 | 100 |
| BIMS2 (Another brominated copolymer rubber) | Br 0.75 mol % PMS 5.0 wt. % isobutylene (C4) | | | | | | |
| BIMS3 (Another brominated copolymer rubber) | Br 0.5 mol % PMS 5.0 wt. % isobutylene (C4) | | | | | | |
| Br-IIR (comparison) | Br 1.8 mol % no p-alkylstyrene | | | | | | |
| Carbon black B-1 | SRF C.B. DBP64 ± 12 Iodine adsorption amount 23 ± 5 | | 90 | 70 | 50 | 50 | 90 |
| Carbon black A-1 | FTF C.B DBP 20 to 30 Iodine adsorption amount 20 to 34 | | | | | 30 | |
| Carbon black C-1 | HAF C.B. DBP 97 to 107 Iodine adsorption amount 76 to 86 | 75 | | | | | |
| Talc | — | 30 | | | | | 30 |
| Paraffin oil | — | 5 | 5 | 5 | 5 | 5 | 5 |
| Zinc oxide | — | 2 | 2 | 2 | 2 | 2 | 2 |
| Stearic acid | — | 2 | 2 | 2 | 2 | 2 | 2 |
| Brominated alkylphenol resin | | 3 | 3 | 3 | 3 | 3 | 3 |
| Content of repeating units containing bromine (mol %) (In a case where a specific brominated copolymer rubber and another brominated copolymer are used in combination, their average value) | | 1.20 | 1.2 | 1.2 | 1.2 | 1.20 | 1.2 |

TABLE 1-continued

| | | | | | | | |
|---|---|---|---|---|---|---|---|
| Eb (elongation at break) | % | 160 | 166 | 195 | 224 | 174 | 140 |
| M100 (100% modulus) | MPa | 7.3 | 8.0 | 5.6 | 3.2 | 5.7 | 7.4 |
| Hose sealing performance (Sealing property) | C.I test | Yes | Yes | Poor | Poor | Poor | Yes |
| Mooney viscosity | Vis. @125° C. | 75 Poor | 65 Poor | 57 Yes | 49 Yes | 55 Yes | 65 Poor |

Details of the components described in Table 1 are as follows.

Brominated Copolymer Rubber

BIMS 1: Exxpro 3745, available from ExxonMobil Chemical Company In a copolymer rubber of isomonoolefin (isobutylene) having 4 carbon atoms and p-methylstyrene, BIMS 1 is a brominated copolymer rubber in which p-methylstyrene is brominated and converted into bromomethylstyrene. The content of the repeating units of the bromomethylstyrene was 1.2 mol % with respect to the total amount of the repeating units constituting the specific brominated copolymer rubber. BIMS 1 corresponds to a specific brominated copolymer rubber. The content of the repeating units of p-methylstyrene in the specific brominated copolymer rubber was 7.5 mass % with respect to the total amount of the repeating units constituting the specific brominated copolymer rubber.

BIMS 2: Exxpro 3433, available from ExxonMobil Chemical Company In a copolymer rubber of isomonoolefin (isobutylene) having 4 carbon atoms and p-methylstyrene, BIMS 2 is a brominated copolymer rubber in which p-methylstyrene is brominated and converted into bromomethylstyrene. The content of the repeating units of the bromomethylstyrene was 0.75 mol % with respect to the total amount of the repeating units constituting the brominated copolymer rubber. BIMS 2 corresponds to the another brominated copolymer rubber described above. The content of the repeating units of p-methylstyrene in the brominated copolymer rubber was 5.0 mass % with respect to the total amount of the repeating units constituting the brominated copolymer rubber.

BIMS 3: Exxpro 3035, available from ExxonMobil Chemical Company In a copolymer rubber of isomonoolefin (isobutylene) having 4 carbon atoms and p-methylstyrene, BIMS 3 is a brominated copolymer rubber in which p-methylstyrene is brominated and converted into bromomethylstyrene. The content of the repeating units of the bromomethylstyrene was 0.5 mol % with respect to the total amount of the repeating units constituting the brominated copolymer rubber. BIMS 3 corresponds to the another brominated copolymer rubber described above. The content of the repeating units of p-methylstyrene in the brominated copolymer rubber was 5.0 mass % with respect to the total amount of the repeating units constituting the brominated copolymer rubber.

Br-IIR (comparative): brominated butyl rubber (bromobutyl rubber represented by the following formula) EXXON BROMOBUTYL 2255, manufactured by Japan Butyl Co., Ltd. The brominated butyl rubber as described above in which the bromine content (the number of repeating units of m) is 1.8 mol % with respect to the sum of l and m in the following formula. Since the brominated butyl rubber does not have repeating units of p-alkylstyrene, the brominated butyl rubber does not correspond to the brominated copolymer rubber.

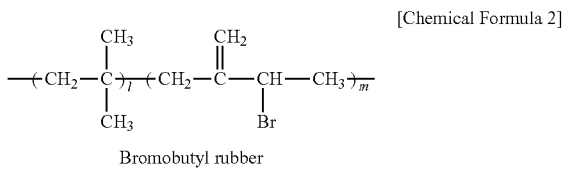

[Chemical Formula 2]

Bromobutyl rubber

Carbon Black

Carbon black B-1: SRF carbon black Asahi #50, available from Asahi Carbon Co., Ltd. DBP absorption amount: 64±12 cm³/100 g, iodine adsorption amount: 23±5 g/Kg. Since the dibutyl phthalate absorption amount of carbon black B-1 corresponds to 50 to 80 cm³/100 g, carbon black B-1 corresponds to carbon black B.

Carbon black A-1: FTF carbon black Asahi Thermal, available from Asahi Carbon Co., Ltd. DBP absorption amount: from 20 to 30 cm³/100 g, iodine adsorption amount: from 20 to 34 g/Kg. Since the dibutyl phthalate absorption amount of carbon black A-1 is 40 cm³/100 g or less, carbon black A-1 corresponds to carbon black A.

Carbon black C-1: HAF carbon black Show Black N330, available from Showa Cabot K.K. DBP absorption amount: from 97 to 107 cm³/100 g, iodine adsorption amount: from 76 to 86 g/Kg. Since the DBP absorption amount of carbon black C-1 is from 97 to 107 cm³/100 g, carbon black C-1 does not correspond to any of the carbon blacks A and B. For convenience, the HAF carbon black is referred to as carbon black C-1.

Talc: Mistron Vapor (available from Nihon Mistron Co., Ltd.)

Paraffin oil: Process Oil 123, available from Showa Shell Sekiyu K.K.

Zinc oxide: Zinc Oxide III, available from Seido Chemical Industry Co., Ltd.

Stearic acid: Stearic Acid 50S, available from New Japan Chemical Co., Ltd.

Brominated alkylphenol resin: brominated alkylphenol formaldehyde resin Tucky Roll 250-I, available from Taoka Chemical Co., Ltd.

As is clear from the results shown in Table 1, Comparative Examples 1 and 2 in which the content of the repeating units having bromine constituting the brominated copolymer rubber did not satisfy the predetermined range had a low 100% modulus and poor sealing property.

Comparative Example 3 containing no specific brominated copolymer rubber but containing brominated butyl rubber instead had a low 100% modulus and poor hose sealing property.

Comparative Examples 4 and 5 not containing the above carbon black A but containing carbon black having a DBP absorption amount larger than those of the carbon blacks A and B had a high Mooney viscosity and poor workability. Comparative Example 4 in which the amount of carbon black was smaller than that in Comparative Example 5 had a further lower 100% modulus and poor hose sealing property.

Comparative Examples 6 to 8 and 10 not containing the above carbon black A but containing carbon black B having a larger DBP absorption amount than the carbon black A had a low 100% modulus and poor hose sealing property, or high Mooney viscosity and poor workability.

Comparative Example 9 in which the content of the carbon black A was less than the predetermined range had a low 100% modulus and poor hose sealing property.

As compared with the comparative example, each of the outer tube rubber compositions of the above examples had a low Mooney viscosity and was excellent in hose sealing performance. Further, the outer tube rubber composition of the above-mentioned respective examples all had a high 100% modulus.

Therefore, the hose of the present invention having the outer tube formed of the outer tube rubber composition can achieve both excellent workability and excellent sealing property.

REFERENCE SIGNS LIST 10, 20, 30 Refrigerant-transporting hose (hose)
11, 21, 31 Inner tube
14, 24, 34, 35 Reinforcing layer
16, 26, 36 Outer tube
22, 32 Innermost layer
23, 33 Barrier layer
28, 37, 38 Intermediate rubber layer

The invention claimed is:

1. A refrigerant-transporting hose comprising: an inner tube; an outer tube;
and a reinforcing layer between the inner tube and the outer tube, the outer tube being formed of an outer tube rubber composition, the outer tube rubber composition comprising a brominated copolymer rubber obtained by brominating a copolymer rubber of isomonoolefin and p-alkylstyrene, a content of repeating units having bromine being from 0.8 to 1.5 mol % with respect to the total amount of repeating units constituting the brominated copolymer rubber, a carbon black A having a dibutyl phthalate absorption amount of 40 cm$^3$/100 g or less, a brominated alkylphenol resin, and zinc oxide, the content of the carbon black A being 35 parts by mass or greater with respect to 100 parts by mass of the brominated copolymer rubber.

2. The refrigerant-transporting hose according to claim 1, wherein the iodine adsorption amount of the carbon black A is from 10 to 40 g/kg.

3. The refrigerant-transporting hose according to claim 1, wherein the carbon black A is FTF carbon black.

4. The refrigerant-transporting hose according to claim 1, further comprising a carbon black B having a dibutyl phthalate absorption amount from 50 to 80 cm$^3$/100 g.

5. The refrigerant-transporting hose according to claim 4, wherein the iodine adsorption amount of the carbon black B is from 15 to 30 g/kg.

6. The refrigerant-transporting hose according to claim 4, wherein the carbon black B is SRF carbon black.

7. The refrigerant-transporting hose according to claim 4, wherein the content of the carbon black B is from 20 to 120 parts by mass with respect to 100 parts by mass of the brominated copolymer rubber.

8. The refrigerant-transporting hose according to claim 1, wherein the outer tube rubber composition further comprises talc, and the content of the talc is from 10 to 80 parts by mass with respect to 100 parts by mass of the brominated copolymer rubber.

9. The refrigerant-transporting hose according to claim 1, wherein the content of the repeating units having bromine constituting the brominated copolymer rubber is from 1.1 to 1.3 mol % with respect to the total amount of the repeating units constituting the brominated copolymer rubber.

10. The refrigerant-transporting hose according to claim 1, wherein the outer tube rubber composition further comprises a brominated copolymer rubber obtained by brominating a copolymer rubber of isomonoolefin and p-alkylstyrene, a content of the repeating units having bromine being less than 0.8 mol % or greater than 1.5 mol % with respect to the total amount of the repeating units constituting the brominated polymer rubber, the content of the carbon black A being 35 parts by mass or greater with respect to 100 parts by mass of the total combined amount of the brominated copolymer rubber in which the content of the repeating units having bromine is from 0.8 to 1.5 mol % with respect to the total amount of the repeating units constituting the brominated copolymer rubber, and the brominated copolymer rubber in which the content of the repeating units having bromine is less than 0.8 mol % or greater than 1.5 mol % with respect to the total amount of the repeating units having bromine constituting the brominated copolymer rubber.

11. The refrigerant-transporting hose according to claim 1, wherein the tensile stress (M100) at 100% elongation of a rubber obtained by crosslinking the outer tube rubber composition is 7 MPa or greater.

12. The refrigerant-transporting hose according to claim 1, wherein the inner tube has a plurality of layers, the innermost layer is a rubber layer, and the inner tube has a barrier layer outside the innermost layer.

13. The refrigerant-transporting hose according to claim 12, wherein the barrier layer comprises a polyamide resin.

14. The refrigerant-transporting hose according to claim 1, wherein the reinforcing layer is a plurality of reinforcing layers.

15. The refrigerant-transporting hose according to claim 1, which is a refrigerant-transporting hose for an automobile.

* * * * *